United States Patent [19]

Lee

[11] Patent Number: 5,615,573
[45] Date of Patent: Apr. 1, 1997

[54] LEVEL DETECTOR

[75] Inventor: Ron C. Lee, Bloomsbury, N.J.

[73] Assignee: The BOC Group, Inc., New Providence, N.J.

[21] Appl. No.: 273,034

[22] Filed: Jul. 8, 1994

[51] Int. Cl.$^6$ ............................................. G01F 23/00
[52] U.S. Cl. .................. 73/295; 73/292; 374/54
[58] Field of Search ................... 73/292, 295; 374/54, 374/135; 62/49.2

[56] References Cited

U.S. PATENT DOCUMENTS

| | | | |
|---|---|---|---|
| 2,456,617 | 12/1948 | Burch | 73/295 |
| 3,496,773 | 2/1970 | Cornish | 73/295 |
| 3,566,676 | 3/1971 | Hays | 73/295 |
| 4,592,230 | 6/1986 | Waring et al. | 73/295 |
| 4,655,079 | 4/1987 | Masumoto et al. | 73/295 |
| 4,915,507 | 4/1990 | Janotta | 73/295 |
| 5,167,154 | 12/1992 | Lee | 73/295 |
| 5,209,115 | 5/1993 | Bond | 73/295 |
| 5,211,904 | 5/1993 | Oosterkamp | 73/295 |
| 5,393,736 | 2/1995 | Hodge et al. | 73/295 |

*Primary Examiner*—William A. Cuchlinski, Jr.
*Assistant Examiner*—Andrew Hirshfeld
*Attorney, Agent, or Firm*—David M. Rosenblum; Larry R. Cassett

[57] ABSTRACT

A level detector for detecting a level of a liquid is provided with an elongated probe having opposed proximal and distal ends. In use, the distal end of the elongated probe is submerged beneath the level of the liquid with an unwetted length of the elongated probe located above the level of the liquid. A thermal conductor or an electrical heater is provided for maintaining a temperature difference between the proximal end of the elongated probe and the liquid so that at an intermediate location of the elongated probe, located above the level of the liquid, the temperature will be dependent upon the unwetted length of the elongated probe. A thermocouple or the like can be provided for generating a signal referable to the temperature at the intermediate location and the level of the liquid can thereby be correlated with such signal.

5 Claims, 1 Drawing Sheet

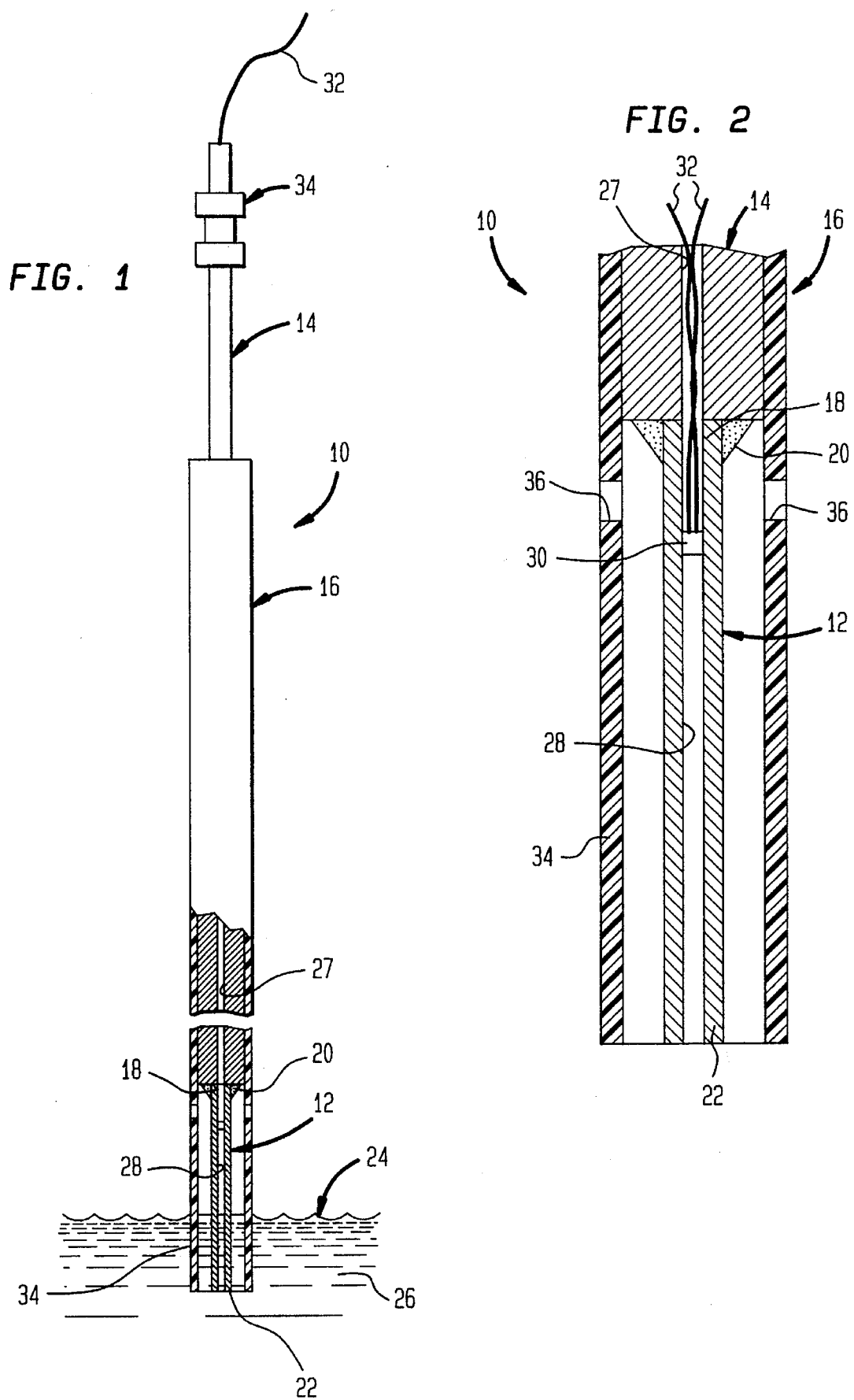

LEVEL DETECTOR

BACKGROUND OF THE INVENTION

The present invention relates to a level detector to detect the level of a liquid. More particularly, the present invention relates to such a level detector in which an intermediate temperature of an unwetted length of an elongated probe is sensed to determine the height of the liquid level.

The prior art has provided a variety of devices that are used to sense the level of a liquid. Common level detectors use electrical capacitance measurements or hydrostatic pressure to measure the continuous level of a liquid. There are also point level detectors. In U.S. Pat No. 5,167,154, invented by the inventor herein, a thermal conductor sheathed in an insulator is provided to conduct heat from the ambient to a distal, sensing end of the device. At the distal end of the thermal conductor, a thermocouple is provided to sense temperature. Since the liquid has a greater convective heat transfer coefficient than the vapor phase of the liquid overlying the liquid, upon submergence of the distal end of the probe, the temperature will decrease in proportion to the increase in the heat transfer coefficient. This will result in a decrease in temperature sensed by the thermocouple which can be interpreted as the liquid reaching the point or distal end of the probe.

Point level detectors do not, however, sense the actual height of the liquid level above a reference point. As will be discussed, the present invention provides a level detector to detect the height of a liquid level.

SUMMARY OF THE INVENTION

The present invention provides a level detector for detecting a level of a liquid. The level detector comprises an elongated probe having opposed proximal and distal ends. The elongated probe is operable to be partially submerged with its distal end located beneath the level of the liquid and an unwetted length of the elongated probe located above the level of the liquid. As used herein and in the claims, the term "unwetted length" when used in connection with the elongated probe means a probe length measured between the liquid level and the proximal end of the probe. A means is provided for maintaining a temperature difference between the proximal end of the elongated probe and the liquid. As a result, an intermediate location of the elongated probe, located above the level of the liquid, will have a temperature dependent upon the unwetted length of the elongated probe. For instance, assuming the measurement of a liquid cryogen, the temperature will vary along the unwetted length of the probe from the proximal end of the probe, which is warmer than the liquid cryogen, and the point of the probe that is coincident with the level of the liquid. The higher the level of the liquid, the lower the temperature of the intermediate point of the elongated probe. The temperature of such intermediate point is therefore a function of the height of the liquid relative to the distal end of the elongated probe. A means is also provided for generating a signal referable to the temperature of the intermediate location of the elongated probe. The signal can be an electrical signal generated by a thermocouple. The electrical signal can be correlated with the intermediate point temperature and thus, the height of the liquid level relative to the distal end of the probe.

In many cases, it is only necessary to know the level of a liquid at fixed (e.g., high-low) locations which could correspond to fixed intermediate point temperatures measured on the probe. In other cases, such as a continuous filling operation with a proportional valve, it is only necessary to have a signal that is proportional to the height without actually interpreting what that height is except at the desired, or set, position. The foregoing are ideal applications of a level detector in accordance with the present invention.

BRIEF DESCRIPTION OF THE DRAWINGS

While the specification concludes with claims distinctly pointing out the subject matter that applicant regards as his invention, it is believed that the invention will be better understood when taken in connection with the accompanying drawings in which:

FIG. 1 is a partial sectional view of a level detector in accordance with the present invention; and FIG. 2 is an enlarged, fragmentary view of FIG. 1.

DETAILED DESCRIPTION

With reference to FIG. 1, a level detector 10 in accordance with the present invention is illustrated. Level detector 10 is provided with an elongated probe 12, an elongated thermal conductor 14 and an insulation sheath 16.

Elongated probe 12 has a proximal end 18 connected to elongated thermal conductor 14 by a connecting means 20, such as epoxy or solder. A distal end 22 of elongated probe 12 is located opposite proximal end 18. When level detector 10 is used, elongated probe 12 is partially submerged with distal end 22 located beneath a level 24 of a liquid 26 to be detected. An unwetted length of elongated probe 12 is thereby defined between proximal end 18 of elongated probe 12 and liquid level 24.

In a possible embodiment of the subject invention, elongated probe 12 is formed by a copper tube 8.0 cm in length and about 1.5 mm in diameter. In order to ensure sufficient response by a level detector in accordance with the present invention, the material used for the elongated probe 12 should preferably have a thermal diffusivity of at least $50 \times 10^{-6}$ m$^2$/s, such as copper. This will ensure a response time of less than about two minutes. If, for instance, elongated probe 12 were fabricated from stainless steel having a thermal diffusivity of approximately $3.5 \times 10^{-6}$ m$^2$/s, the response time would be approximately 30 minutes.

As mentioned above, level detector 10 functions by maintaining a temperature difference between proximal end 18 and liquid 26 of elongated probe 12. This is accomplished by elongated conductor 14 connected to proximal end 18 of elongated probe 12 by the connecting means 20. Ambient heat conducts to proximal end 18 of elongated probe 12 for maintenance of such a temperature difference.

Elongated thermal conductor 14 is preferably fabricated from a copper bar about 6.5 mm in diameter and having a bore 27 of approximately 1.0 mm in diameter. Bore 27 is aligned with a bore 28 of thermal probe 12. This permits a thermocouple 30 to be sited within bore 28 with electrical leads 32 thereof trailing through bore 27. Connector 33 functions as an electrical feed-through for electrical leads 22. An electrical heater could be used in place of thermal conductor 14 with added expense and complexity.

Insulated sheath 16 is a tube of suitable insulating material, such as teflon, covering elongated conductor 14 to minimize conduction of heat from conductor 14. Insulation sheath 16 terminates in an annular insulative section 34 surrounding elongated probe 12. Insulative section 34 is provided with at least one opening 36 to permit liquid 26 to rise and fall with liquid level 24 within insulative section 34.

Insulative section 34 allows submergence of elongated probe 12 while minimizing heat transfer to a gas phase of liquid 26 overlying level 24 thereof, and especially minimizes the variable heat transfer that might occur if the outer environment is turbulent or contains a mist.

At an intermediate location of elongated probe 12, located above level 24 of the liquid, a temperature will exist that is dependent upon the unwetted length of elongated probe 12. This temperature T will vary in accordance with a function that can be set forth as $$T_h - \frac{(T_h - T_c)d}{L}$$

where $T_h$ is the temperature of proximal end 18; $T_c$ is the liquid temperature; d is the distance from the intermediate location to proximal end 18; and L is the unwetted length of thermal probe. It is understood the foregoing are idealized response characteristics that neglect various non-ideal heat transfer effects. Thermocouple 30 generates an electrical signal referable to this temperature. The electrical signal and/or the temperature can be correlated with the unwetted distance separating liquid level 24 and proximal end 18 of elongated probe 12 so that the height of liquid 26 can be determined. This correlation can be determined experimentally for various heights of level 24. The resulting signal can then be used either directly or processed to provide a readout of the liquid level 24.

Although not illustrated, a mounting would be provided to mount level detector 10 at a fixed location so that liquid level 24 would rise and fall with respect to level detector 10.

A further point is that although level detector 10 is illustrated in use with respect to a liquid cryogen. The invention is not, however, so limited and in fact has applicability to any liquid.

While the invention has been described with reference to a preferred embodiment, it will be understood by those skilled in the art that numerous additions, changes, and omissions may be made without departing from the spirit and scope of the present invention.

I claim:

1. A level detector for detecting a level of a liquid, said level detector partially submerged in said liquid, said level detector comprising:

an elongated probe having opposed proximal and distal ends and an intermediate location located between the proximal and distal ends and below which the level of the liquid is to be detected;

said elongated probe partially submerged with its said distal end located beneath said level of said liquid and an unwetted length of said elongated probe located above said level of said liquid;

means for maintaining a temperature difference between said proximal end of said elongated probe and said liquid so that the intermediate location of said elongated probe will have a temperature dependent upon said unwetted length thereof; and means situated at the intermediate location for generating a signal referable to said temperature of said intermediate location.

2. The level detector of claim 1, wherein said temperature difference maintaining means comprises:

a thermal conductor; and an insulation sheath covering said conductor so that ambient heat is conducted to said elongated probe.

3. The level detector of claim 2, wherein:

said insulation sheath terminates in an insulative section surrounding said elongated probe and configured to form an annular space that permits submergence of said elongated probe while preventing heat transfer to a gas phase located above said liquid;

said insulative section having at least one opening located near said proximal end of said elongated probe to allow said liquid to rise and fall within said insulative section with said liquid level to be measured.

4. The level of detector of claim 1, wherein:

said elongated probe is surrounded by an insulator configured to form an annular space that permits submergence of said elongated probe while minimizing heat transfer to a gas phase located above said liquid;

said insulator having at least one opening located near said proximal end of said elongated probe to allow said liquid to rise and fall within the insulator with said liquid level to be measured.

5. The level detector of claim 1, wherein:

said elongated probe has an axial bore; and said signal generating means comprises a thermocouple located within said axial bore.

* * * * *